(12) United States Patent
Doerr

(10) Patent No.: US 7,061,596 B2
(45) Date of Patent: Jun. 13, 2006

(54) WAVELENGTH-TRACKING DISPERSION COMPENSATOR

(75) Inventor: Christopher Richard Doerr, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/922,720

(22) Filed: Aug. 19, 2004

(65) Prior Publication Data

US 2006/0038975 A1   Feb. 23, 2006

(51) Int. Cl.
*G01N 21/00* (2006.01)

(52) U.S. Cl. ..................................... 356/73.1

(58) Field of Classification Search ............... None
See application file for complete search history.

(56) References Cited

U.S. PATENT DOCUMENTS

| 6,266,457 | B1 * | 7/2001 | Jacob | 385/11 |
| 6,654,564 | B1 * | 11/2003 | Colbourne et al. | 398/147 |
| 6,714,309 | B1 * | 3/2004 | May | 356/519 |

* cited by examiner

*Primary Examiner*—Tu T. Nguyen

(57) ABSTRACT

A wavelength-tracking dispersion compensator (WT-DC) tracks the wavelength of a received input signal. The WT-DC includes an input signal optical monitor, a differential detector control circuit, a temperature controller, and an input signal dispersion compensator. The monitor includes a Mach-Zehnder interferometer that matches the dispersion compensator free-spectral range or an integer sub-multiple or multiple thereof. The monitor is coupled to the differential detector control circuit that controls a temperature controller to set the temperature of the monitor and dispersion compensator. The WT-DC automatically tracks the wavelength of the input signal. In a preferred embodiment, the monitor and the dispersion compensator are integrated on the same planar lightwave circuit chip and include a half-wave plate.

23 Claims, 5 Drawing Sheets

WAVELENGTH-TRACKING DISPERSION COMPENSATOR

TECHNICAL FIELD OF THE INVENTION

This invention relates generally to optical dispersion compensators and, more particularly, to a method and apparatus for implementing a wavelength-tracking dispersion compensator.

BACKGROUND OF THE INVENTION

Optical signal dispersion compensators (DCs) can correct for chromatic dispersion in optical fiber and are especially useful for bit rates 10 Gb/s and higher. Furthermore, it is advantageous for the dispersion compensator to have an adjustable, also called "tunable", amount of dispersion, facilitating system installation. It is also advantageous if the tunable dispersion compensator (TDC) is colorless, i.e., one device can compensate many channels simultaneously or be selectable to compensate any channel in the system.

Previously proposed colorless TDCs include ring resonators, the virtually imaged phased array (VIPA), cascaded Mach-Zehnder interferometers (MZIs), temperature-tuned etalons, waveguide grating routers (WGRs) with thermal lenses, and bulk gratings with deformable mirrors.

In my recently filed application entitled "TUNABLE DISPERSION COMPENSATOR" filed on Jan. 20, 2004, Ser. No. 10/760,516, now U.S. Pat. No. 6,961,492, I described a method and apparatus for implementing a colorless Mach-Zehnder-interferometer-based tunable dispersion compensator. While this TDC achieves a large dispersion range with a very simple design, it has a drawback in that it has a very narrow optical bandwidth. It can tolerate a misalignment between the wavelength of the transmitter and a center wavelength of the TDC, within one of the TDC free-spectral ranges, of about +/−20 pm. This TDC optical bandwidth is acceptable for wavelength-locked transmitters, but many applications use non-wavelength-locked transmitters, also called "TDM" transmitters. TDM transmitters usually have a wavelength drift specification of +/−100 pm over their lifetime, which may be too large for the TDC optical bandwidth.

To overcome this optical bandwidth limitation and to accommodate for a TDM transmitter wavelength drift specification, I disclosed locking the TDC to the TDM transmitter laser wavelength by adjusting phase shifters in the two outermost MZIs of the three MZI stage TDC. For instance, by increasing the drive to phase shifters in both longer arms of the two outermost MZIs in unison, the TDC can be tuned to longer wavelengths. The feedback control mechanism for the locking is derived by dithering these phase shifters in the outermost MZIs in unison at a specific frequency and measuring the output power from the TDC using a tap and a photodetector, employing a standard peak-detection feedback control.

However, the use of dithering undesirably adds optical modulation to the data modulated wavelength signal being transmitted through the TDC and over the system, which may affect the ability of a receiver to detect the data modulated on that wavelength signal. Additionally, since data modulation of the wavelength signal appears as dithering, it would adversely cause the TDC to change its center wavelength and affect dispersion compensation. Additionally, such a dithering technique does not adequately work for low dispersion settings.

Thus, there is a continuing need for a TDC that has both a large dispersion range and which can accommodate for a TDM transmitter wavelength drift specification that can vary +/−100 pm over its lifetime.

SUMMARY OF THE INVENTION

In accordance with the present invention, I disclose a method and apparatus for implementing a wavelength-tracking dispersion compensator (WT-DC) that tracks the wavelength of a received input signal. The WT-DC includes an input signal optical monitor, a differential detector control circuit, a temperature controller, and an input signal dispersion compensator (DC). The monitor includes a Mach-Zehnder interferometer with a free-spectral range that matches the DC free-spectral range or an integer submultiple or multiple thereof. The two outputs of the monitor are coupled to two photodetectors of the differential detector control circuit. The differential detector control circuit uses the difference current between the photodetectors to control the temperature controller to set the temperature of the monitor and DC. In this manner, the WT-DC automatically tracks the wavelength of the input signal. In a preferred embodiment, the monitor and the DC are integrated on the same planar lightwave circuit chip. Because the monitor is integrated on the same chip as the DC, it adds minimal cost and it guarantees that the wavelength of the monitor and DC track together with temperature. In another preferred embodiment, to further improve performance the DC is made to have tunable dispersion. Hereafter the term DC is used to identify a dispersion compensator that could be either fixed or tunable without changing the scope of the invention.

More particularly, in one embodiment of my WT-DC, the compensator comprises a chromatic dispersion compensator, DC, having a temperature-dependent wavelength characteristic and operating at a reference wavelength for receiving an input signal that has a wavelength that can vary over time, a wavelength monitor, having a temperature-dependent wavelength characteristic and operating at the same reference wavelength as the DC for receiving the input signal and for generating two optical output signals, a differential detector control circuit for detecting the two optical output signals and for generating a control signal that indicates when the wavelength of the received input signal is misaligned with the reference wavelength of the DC, and a temperature controller for changing the temperature of both the DC and the wavelength monitor in response to the control signal so as to change the reference wavelength of the DC and the wavelength monitor to align with the wavelength of the received input signal.

In another embodiment, the wavelength monitor generates only one optical output signal and the detector control circuit detects that signal and generates the control signal. In another embodiment, both the DC and wavelength monitor are located on the same chip (or substrate). According to one feature, the free-spectral range (FSR) of the DC is equal to N or 1/N times the FSR of the monitor, where N is a positive integer. According to another feature, when the input signal is a multiwave signal the FSR of the DC is equal to the channel spacing of the multiwave signal divided by a positive integer M. In yet other embodiments, the WT-DC is integrated as part of an optical apparatus consisting of one or more of the following optical components including an optical transmitter, optical amplifier, optical filter, wavelength multiplexer, wavelength demultiplexer, and optical receiver.

BRIEF DESCRIPTION OF THE DRAWINGS

The present invention will be more fully appreciated by consideration of the following Detailed Description, which should be read in light of the accompanying drawing in which.

In the following description, identical element designations in different figures represent identical elements. Additionally in the element designations, the first digit refers to the figure in which that element is first located (e.g., 101 is first located in FIG. 1).

DETAILED DESCRIPTION

Figure 1:
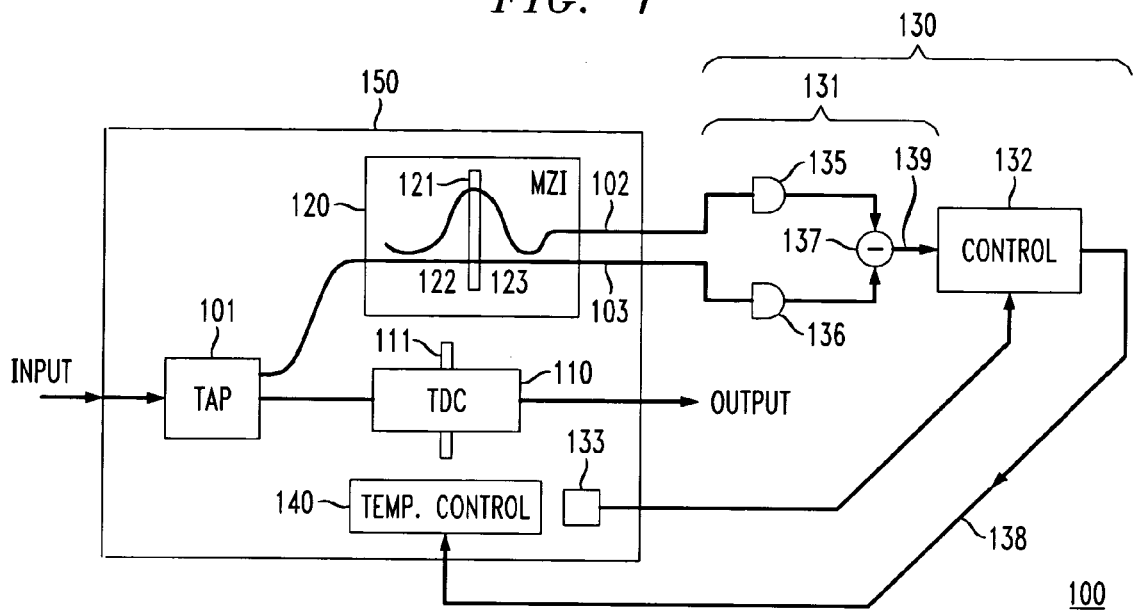
FIG. 1 illustrates a wavelength-tracking dispersion compensator (WT-DC) in accordance with the present invention.

With reference to FIG. 1, in accordance with the present invention, there is shown an illustrative diagram of my wavelength-tracking dispersion compensator (WT-DC). My WT-DC 100 includes four basic units (1) a temperature-dependent chromatic optical signal dispersion compensator (DC) 110, (2) a temperature-dependent wavelength monitor 120, a differential detector control circuit 130, and (3) a temperature controller 140 for changing the temperature of both the DC 110 and wavelength monitor 120. In a preferred embodiment of my WT-DC, the DC 110 and wavelength monitor 120 are mounted on a common substrate or chip. In another embodiment, the DC 110 is implemented to have a fixed dispersion compensation. In yet another embodiment, a half-wave plate is added to the DC 110 and wavelength monitor 120 to make them polarization independent.

Illustratively, DC 110 may be implemented using any of the embodiments described in my co-pending application designated C. R. Doerr 81, entitled "TUNABLE DISPERSION COMPENSATOR," Ser. No. 10/760,516, filed on Jan. 20, 2004 (hereinafter prior TDC application) and incorporated by reference herein. Briefly, that application described a method and apparatus for implementing a colorless polarization independent Mach-Zehnder-interferometer (MZI)-based tunable dispersion compensator (TDC) that has only three MZI stages (two MZI stages in a reflective version) and two adjustable couplers which are responsive to one control voltage, making it compact, low power, and simple to fabricate, test, and operate. The TDC achieves polarization independence using a half-wave plate positioned across the midpoints of the two path lengths of middle stage MZI to exchange the TE and TM polarizations. Such an MZI-based TDC with a 25-GHz-free-spectral-range version can compensate ~±2100 ps/nm for 10 Gb/s signals. Having a free-spectral range (FSR) equal to the system channel spacing divided by an integer makes it possible for the TDC to compensate many channels either simultaneously and also compensate the case where the wavelength is jumping between different channels without adjustment of the TDC. For example, the 25 GHz free-spectral range, as well as the free-spectral ranges 20 GHz and 33.3 GHz, will allow for the TDC to compensate multiple channels on a 100-GHz grid. While my prior TDC application describes a TDC implemented to have an adjustable dispersion compensation, the operation of my WT-DC 100 does not require that DC 110 have an adjustable dispersion compensation, although an adjustable dispersion compensation DC 110 is the preferred embodiment. Additionally, while my prior TDC application describes a TDC as including a half-wave plate, the operation of my WT-DC 100 does not require that DC 110 have a half-wave plate, although in a preferred embodiment of the present invention, a common half-wave plate (or separate half-wave plates, if desirable) is added to DC 110 and wavelength monitor 120 to make them both polarization independent.

While my prior TDC application achieves a large dispersion range with a very simple design, it has a drawback in that it has a very narrow optical bandwidth. It can tolerate a misalignment between the wavelength of the transmitter (the input signal to the TDC) and a center wavelength of the TDC, within one of the TDC free-spectral ranges, of about +/−20 pm. This is acceptable for wavelength-locked transmitters, but many applications use non-wavelength-locked transmitters, also called "TDM" transmitters. Such TDM transmitters usually have a wavelength drift specification of +/−100 pm over their lifetime. To make the TDC have a wide enough bandwidth to cover this range and still deliver the same dispersion range would require the TDC to become much larger and much more complicated.

In my prior TDC application, the optical bandwidth is generally adequate if wavelength-locked transmitter lasers are employed in the system. However, in some systems, the uncertainty in the laser wavelength may be too large for the TDC optical bandwidth. In such a case, in my prior TDC application I discussed that I can lock the TDC to the laser wavelength by adjusting phase shifters in the two outermost MZIs. For instance, by increasing the drive to phase shifters in both longer arms of the two outermost MZIs in unison, one can tune the TDC to longer wavelengths. The feedback for the locking can be derived by dithering these phase shifters in the outermost MZIs in unison at a specific frequency and measuring the output power from the TDC using a tap and a photodetector, employing a standard peak-detection feedback control.

However, the use of dithering undesirably adds optical modulation to the data modulated wavelength signal being transmitted through the TDC, (over the system), which may affect the ability of a receiver to detect the data modulated on that wavelength signal. Additionally, since data modulation of the wavelength signal appears as dithering, it would adversely cause the TDC to change its center wavelength and affect dispersion compensation. Additionally, such a dithering technique does not adequately work for low dispersion settings.

With reference to FIG. 1, my novel WT-DC 100 of the present invention provides a unique solution to tuning DC 110 to input signals that are derived from non-wavelength-locked transmitter lasers. My WT-DC 100 integrates DC 110 and an optical wavelength monitor 120 on the same planar lightwave circuit chip or substrate 150. Since DC 110 and wavelength monitor 120 both have a temperature-dependent wavelength characteristic, changing the temperature of chip 150 is used to change both the reference (or center) operating wavelength of DC 110 and wavelength monitor 120. Differential detector control circuit 130 monitors the output from the wavelength monitor 120 to determine any difference between the wavelength of the received INPUT signal (e.g., the received non-wavelength-locked transmitter laser signal) and the reference operating wavelength of the DC 110 and generates a control signal 138 that is used to control the chip 150 temperature. This control signal 138 controls temperature controller 140 to change the temperature of the chip or substrate 150. In the above-described manner, the optical wavelength monitor 120, differential detector control circuit 130, and temperature controller 140 are used to adjust the temperature of chip 150 so as to align the center wavelength of the DC 110 with the wavelength of the received INPUT signal.

The temperature sensor 133 provides a temperature reading to control circuit 132. Control circuit 132 uses the temperature reading to insure that the temperature does not vary when WT-DC 100 is in a stand-by mode or when no INPUT signal is received.

The wavelength monitor 120 includes a Mach-Zehnder interferometer (MZI) device with a free-spectral range that matches the DC 110 free-spectral range or is an integer multiple thereof. As noted, the INPUT signal to WT-DC 100 is typically a laser signal or other optical wavelength signal from a transmitter that has a wavelength that can vary over time. This INPUT signal is coupled to a splitter or tap 101, one output of which is coupled to an input of DC 110 and the second output is coupled to an input of wavelength monitor 120. The two optical outputs 102 of the wavelength monitor 120 are coupled to the inputs of differential detector 131 of differential detector control circuit 130. The optical inputs are coupled to two photodetectors 135 and 136, the outputs of which are subtracted in subtractor 137 to form a differential dc current. The differential dc current is connected to control circuit 132, which generates a control signal 138 that is used by temperature controller 130 to adjusts the temperature of chip (or substrate) 150. Thus the differential dc current between the photodetectors 135 and 136 is used to control the temperature of both the DC 110 and wavelength monitor 120. While preferably both the DC 110 and wavelength monitor 120 are located on the same chip (or substrate) 150, they need not be. Both DC 110 and wavelength monitor 120 are implemented using MZI devices that are very similar, in that they both exhibit the same general group delay, transmissivity, and temperature-dependent wavelength characteristics. Since both DC 110 and wavelength monitor 120 have comparable temperature-dependent wavelength characteristic and are both formed on the same chip 150, changing the temperature of chip 150 equally affects both the reference (or center) operating wavelengths of DC 110 and wavelength monitor 120. As a result, any increase/decrease adjustment of the temperature of chip 150 enables WT-DC 100 to increase/decrease its reference wavelength to automatically track any change in the wavelength of INPUT signal. Since my WT-DC 100 integrates wavelength monitor 120 on the same chip 150 as DC110, the wavelength monitor 120 adds little additional cost to the chip 150.

As a further enhancement, a half-wave plate 121 is added at the symmetry location across both arms of the MZI to remove the polarization dependence. Thus, for example, if the TE polarized lightwave portion of the received optical signal travels through the longer arm of MZI in the first half, 122, of MZI, the half-wave plate 121 rotates the TE polarized lightwave so that it becomes the TM polarized lightwave and travels the longer path through the second half, 123, of MZI. Correspondingly, the TM polarized lightwave portion of the received optical signal travels through the shorter arm in the first half, 122, of MZI and half-wave plate 121 rotates the TM polarized lightwave so that it becomes the TE polarized lightwave which travels through the shorter arm through the second half, 123, of MZI.

Conversely in the above description, the roles of the TE and TM lightwave portions can be reversed, i.e., the TM lightwave portion travels through the longer arm and TE lightwave portion travels through the shorter arm of MZI in the first half 122.

As a consequence half-wave plate 121 eliminates any differential polarization-dependent wavelength shift (PDW) between the TE and TM polarized lightwaves as they pass through the MZI.

According to another aspect of my invention, the half-wave plate 121 and the half-wave plate 111 of the TDC described in my co-pending application can be combined as one common half-wave plate that provides polarization independence to both the MZI and DC 110.

Figure 2A:
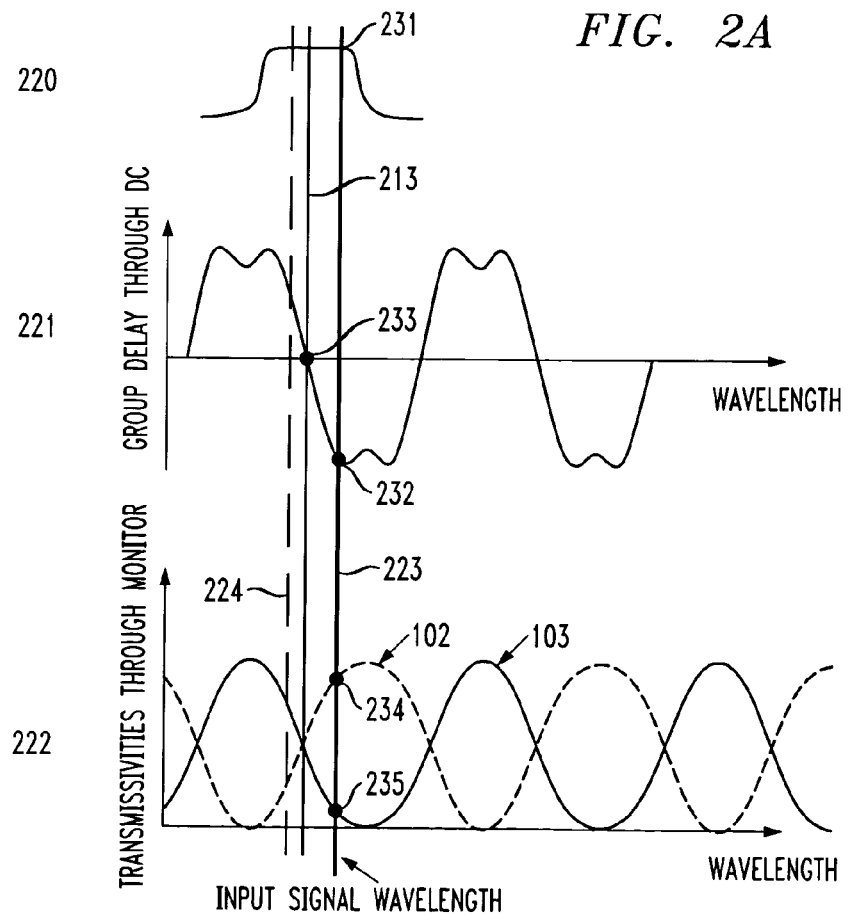
FIGS. 2A and 2B illustrate some operating characteristics of the temperature dependent wavelength monitor.
Figure 2B:
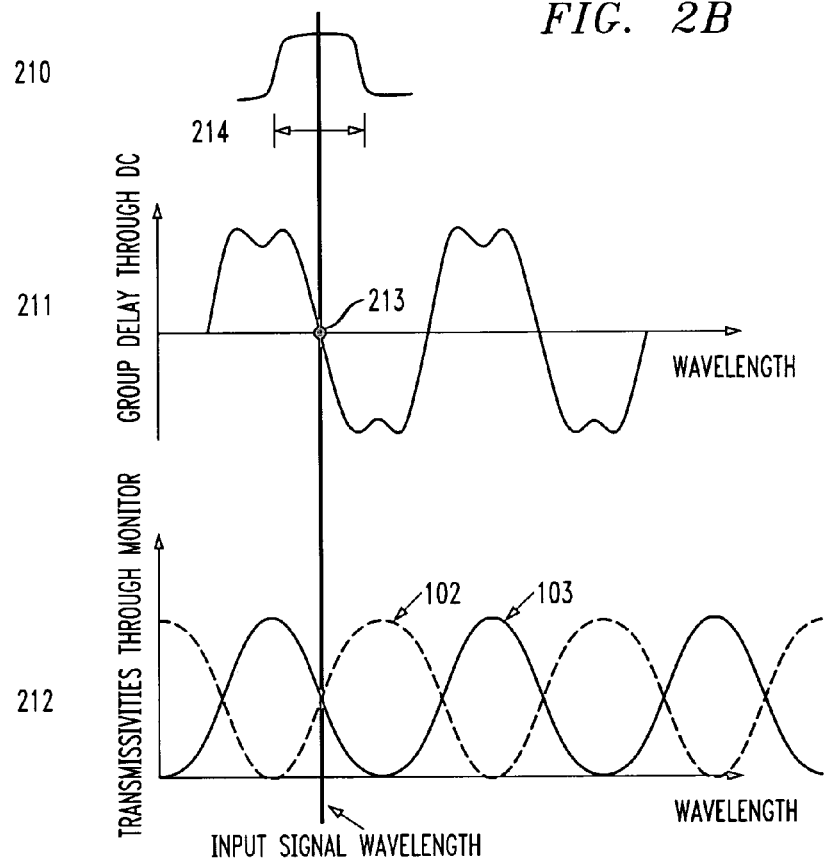

With joint reference to FIGS. 1, 2A and 2B, specific operating characteristics of WT-DC 100 is described. FIGS. 2A and 2B illustrate the dispersion and group delay of DC 110 and the transmissivity of wavelength monitor 120 when the INPUT signal is aligned (FIG. 2B) and misaligned (FIG. 2A) with the center (or reference) wavelength 213 of DC 110. Note that the dispersion and group delay characteristics of wavelength monitor 120 (not shown) would be about the same as those shown for DC 110. As shown in FIG. 2B, during the aligned state the INPUT signal has the same wavelength 213 as the center wavelength of DC 110 and falls within the center of the dispersion bandwidth 214 (where the dispersion value of DC 110 is within its maximum range). The dispersion bandwidth 214 represents the operating wavelength range of DC 110. In the aligned state, the group delay of DC 110 is shown by 211 to be zero. In the aligned state, as shown by 212, the output ports O1 and O2 of wavelength monitor 120 are at equal transmissivity levels. As a result the output of subtractor 137 is zero and control circuit 132 generates a control signal 138 that has a value that signals temperature controller 140 to maintain chip 150 at its present temperature level.

With reference to FIG. 2A, during a misaligned state, the INPUT signal has a wavelength that has changed (e.g., drifted) to a value that is either above 223 or below 224 the center wavelength 213 of DC 110. When the INPUT signal has a wavelength 223 that is above the center wavelength 213 of DC, the dispersion of DC 110 is shown by 220 to still fall within its maximum range value, but be offset to the right side 231 of its bandwidth range and the group delay of DC 110 is shown by 221 to be at a negative value 232, relative to its aligned value 233. In this misaligned state, wavelength monitor 120 has its output port O1 at a higher transmissivity level 234 than output port O2 level 235. As a result the output of subtractor 137 is positive and control circuit 132 generates a control signal 138 at a value that signals temperature controller 140 to adjust the temperature (either raise or lower) of chip 150 until the center wavelength 213 of DC 110 is increased until it aligned with the wavelength 223 of the INPUT signal. When the center wavelength 213 of DC 110 is again aligned with the wavelength 223 of the INPUT signal, the output of subtractor 137 becomes zero and control signal 138 stays at that value that signals temperature controller 140 to maintain chip 150 at its present temperature level.

In a similar manner, when the INPUT signal wavelength has changed to a value 224 that is that is below the center wavelength 213 of DC, the dispersion of DC 110 is shown by 220 to still be within its maximum range value but off to the left side of its bandwidth range and the group delay of DC 110 is shown by 221 to be at a positive value, relative to its aligned value. In this misaligned state, wavelength monitor 120 has its output port O2 at a higher transmissivity level than output port O1. As a result the output of subtractor 137 is negative and control circuit 132 generates a control signal 138 at a value that signals temperature controller 140 to suitably adjust the temperature of chip 150 until the center wavelength 213 of DC 110 is decreased until it aligned with the wavelength 224 of the INPUT signal. When the center wavelength 213 of DC 110 is again aligned with the wavelength 224 of the INPUT signal, the output of subtractor 137 is again zero and control signal 138 again has a value that signals temperature controller 140 to maintain chip 150 at its present temperature level.

Figure 3:
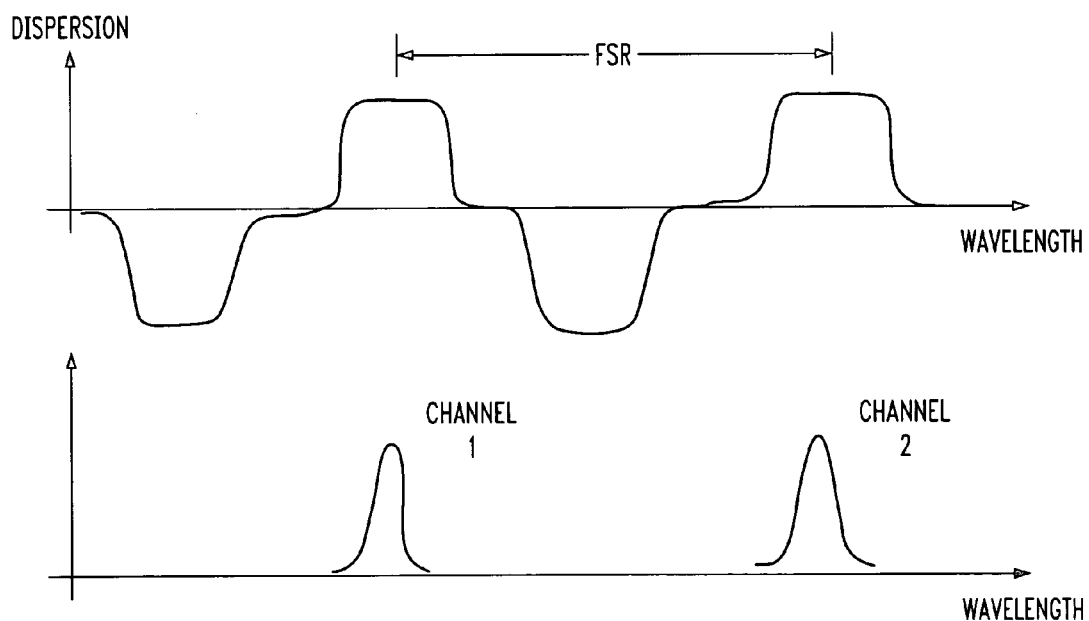
FIG. 3 plots for a multiwave WT-DC arrangement, the variation of dispersion with wavelength over the free spectral range of the WT-DC.

FIG. 3 plots for a multiwave WT-DC 100 arrangement, the variation of the dispersion characteristic with wavelength over the free-spectral range (FSR) of the WT-DC 100. As shown, when the INPUT signal is a multiwave signal (e.g., wavelength division multiplexed signal), the FSR of WT-DC 100 should have a spacing that is equal to the channel spacing of the multiwave signal divided by a positive integer M. Thus in the example shown, the FSR of WT-DC 100 is equal to the channel spacing of the multiwave signal, thus wavelength channels 1 and 2 would each fall within different dispersion bandwidths separated by the FSR. It should be noted that in such a multiwave WT-DC 100 arrangement, the $FSR_{Mon}=N \cdot FSR_{DC}$, where $FSR_{Mon}$ is the FSR of monitor 120, $FSR_{DC}$ is the FSR of DC 110, and N is a positive integer. Thus, $FSR_{Mon}$ is equal to N·M the system channel spacing of the multiwave signal. Having the DC 110 have a FSR equal to the system channel spacing, $FSR_{Mon}$ divided by an integer makes it possible for DC 110 to compensate many channels either simultaneously or to compensate the case where the wavelength is jumping between different channels without adjustment of the DC 110.

For the control signal 138, we described above using the difference between two detectors 135 and 136. In an alternative embodiment, just one detector, such as 135, is used to monitor the input signal. In such an arrangement, the control unit 132 would compare the output signal 139 from the detector 135 against a received power level signal 160 (e.g., from a tap inside an optical amplifier [not shown] is connected either before or after the WT-DC) to determine control signal 138. Another alternative one detector embodiment is if the input signal happens to be wavelength modulated with a predetermined modulation (e.g., using a single variable frequency, fixed frequency, periodic signal, or dithered signal). One illustrative arrangement, is when a dithered signal is used, which sometimes is the case, such as if the input laser has a stimulated Brillouin scattering suppression tone applied to it. In such an embodiment, one can use just one detector, such as 135, and use signal processing on the dithered signal for the control signal 138. This is because the modulation of the wavelength of the input signal will cause the detector 135 to detect that modulation, and the amplitude of the detected modulation will depend on the wavelength alignment between the signal and the monitor.

Figure 4:
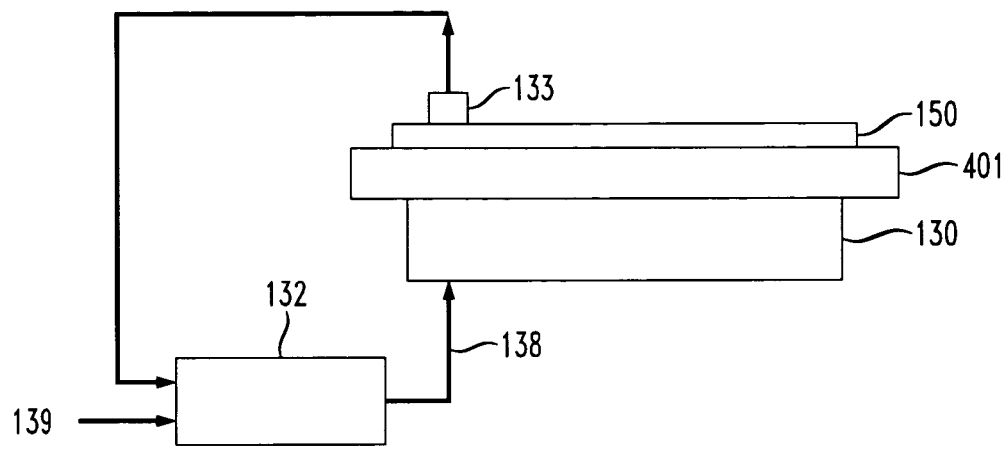
FIG. 4 illustrates a cross-section of one embodiment of the WT-DC.

FIG. 4 illustrates a cross-section of one embodiment of the WT-DC 100 of FIG. 1. As shown, the chip or substrate 150 is mounted on a metal or other type of heat-spreading element 401. The temperature controller 140, which may be a thermoelectric or other type of cooler element, is thermally coupled to heat-spreading element 401. When WT-DC 100 is in a stand-by mode or when no INPUT signal is received, control circuit 132 receives a temperature reading from temperature sensor 133 and input from subtractor 137 and in response thereto generates the control signal 138 to control temperature controller 140. In this manner, control circuit 132 controls the temperature of chip or substrate 150 when WT-DC 100 is in a stand-by mode or when no INPUT signal is received.

Figure 5:
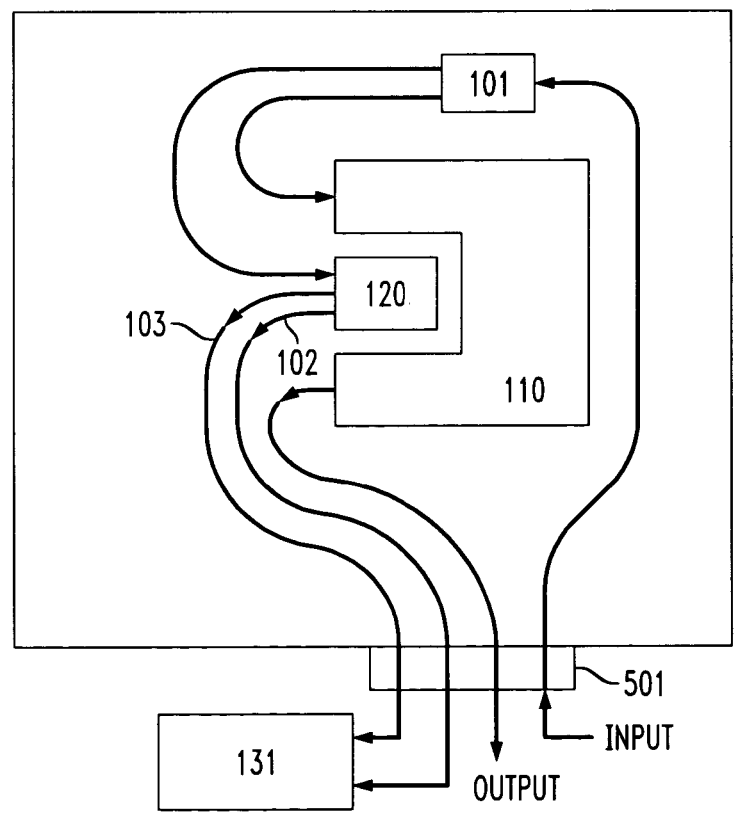
FIG. 5 shows an illustrative compact planar waveguide layout of the WT-DC of FIG. 1.

FIG. 5 shows an illustrative compact planar waveguide layout of the WT-DC 100 of FIG. 1. As shown, the INPUT signal is coupled, via connector 501, to a splitter or tap 101, one output of which is coupled to an input of DC 110 and the second output is coupled to an input of wavelength monitor 120. The two optical outputs 102 of the wavelength monitor 120 are coupled via connector 501 to the inputs of differential detector 131. The OUTPUT of DC 110 is coupled via connector 501 to become the OUTPUT of WT-DC 100. Using the layout arrangement shown for splitter 101, wavelength monitor 120, and DC 110 results in a compact planar waveguide layout for WT-DC 100.

Figure 6A:
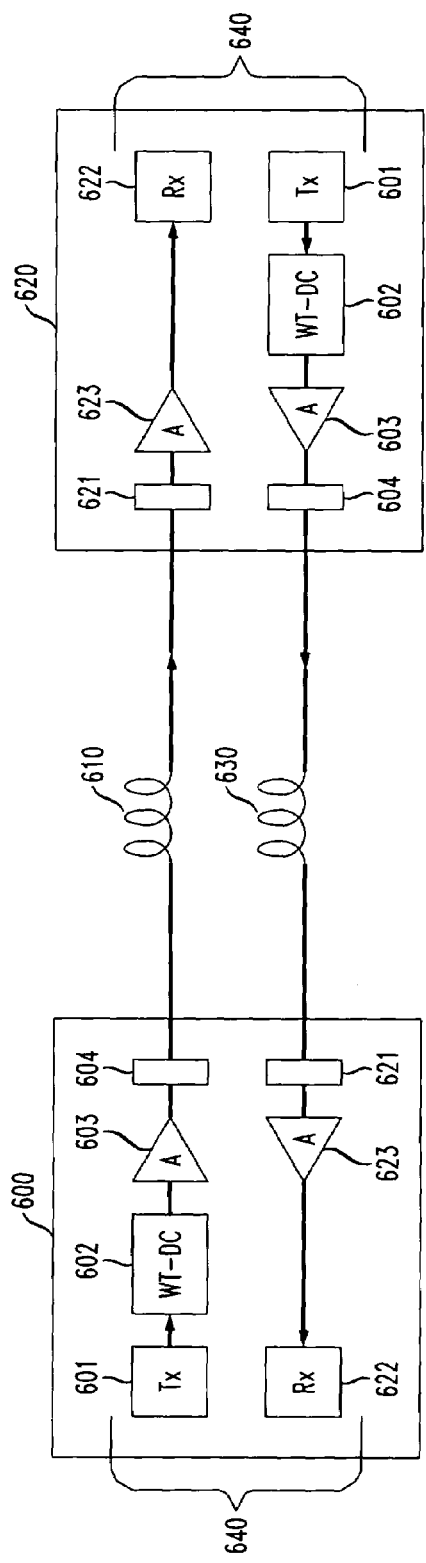
FIGS. 6A and 6B show the use of my WT-DC in illustrative optical transmission systems.
Figure 6B:
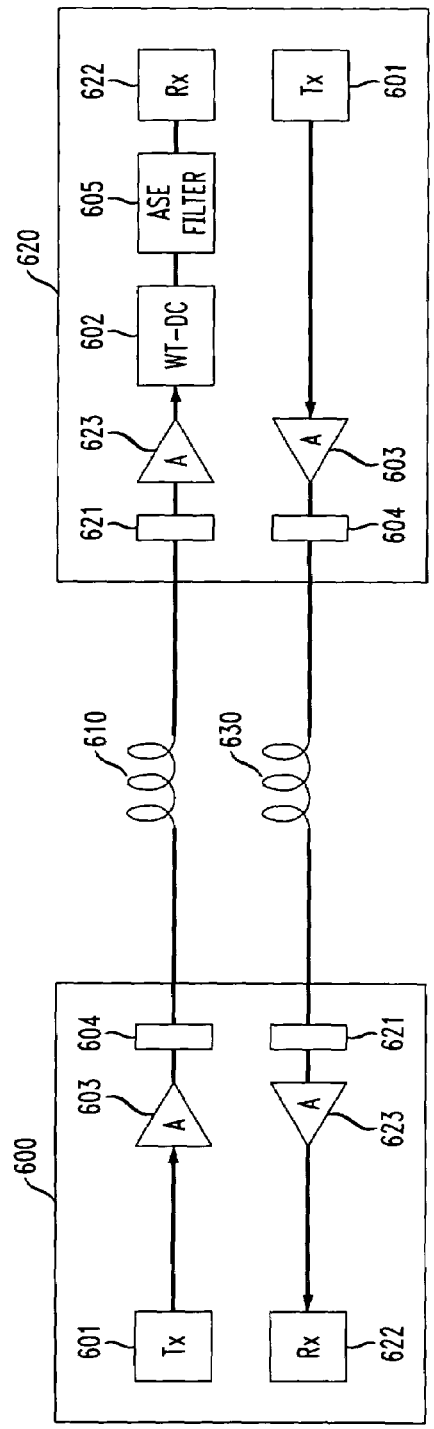

FIGS. 6A and 6B show the use of my WT-DC in illustrative optical transmission systems. FIG. 6A shows a pre-transmission dispersion compensation system where the first location 600 includes an optical transmitter unit 601, a WT-DC 602 used for pre-transmission dispersion compensation, an optical amplifier 603, and a wavelength multiplexer 604, if needed. The output signal is sent over the optical facility 610 to a second location 620 that includes a wavelength demultiplexer 621 (if needed), an amplifier 623, and an optical receiver unit 622. Since the illustrative optical transmission systems is bi-directional, the first location also includes a demultiplexer 621 (if needed), an amplifier 623, and an optical receiver unit 622 connected over optical facility 630 to the second location 620 which includes an optical transmitter unit 601, a WT-DC 602 used for pre-transmission dispersion compensation, an optical amplifier 603, and a multiplexer 604 (if needed). Note that the optical transmitter unit 601 and the optical receiver unit 622 are typically packaged together as a transponder unit 640.

FIG. 6B shows a post-transmission dispersion compensation system where the first location 600 includes an optical transmitter unit 601, an optical amplifier 603, and a wavelength multiplexer 604 (if needed). The output signal is sent over the optical facility 610 to a second location 620 that includes a wavelength demultiplexer 621 (if needed), an amplifier 623, a WT-DC 602 for post-transmission dispersion compensation, an optical filter 605 [e.g., an amplified spontaneous emission (ASE) filter], and an optical receiver unit 622. Since the illustrative optical transmission systems is bi-directional, the first location also includes a demultiplexer 621 (if needed), an amplifier 623, a WT-DC 602, an optical filter 605, and an optical receiver unit 622 connected over optical facility 630 to the second location 620 which includes an optical transmitter unit 601, an optical amplifier 603, and a multiplexer 604 (if needed). The order of the WT-DC 602 and ASE filter 605 could be reversed without affecting system performance.

Note that for a system having a standard single mode fiber (SSMF) optical facility 610 length less than about 80 km, no dispersion compensation is typically needed. For a SSMF optical facility 610 in the range of about 80–135 km the pre-transmission dispersion compensation system of FIG. 6A is preferable. For a SSMF optical facility 610 in the range of about 135–160 km the post-transmission dispersion compensation system of FIG. 6B is preferable.

In the system arrangements of FIGS. 6A and 6B, it should be noted that WT-DC 602 can be integrated together with one or more of the optical components, such as optical transmitter 601, optical amplifier 603, optical filter 605, wavelength multiplexer 604, wavelength demultiplexer 621, and optical receiver 622. For example, the WT-DC 602 could be monolithically integrated in InGaAsP with a laser and an optical modulator to form an optical transmitter with built-in dispersion precompensation.

Figure 7A:
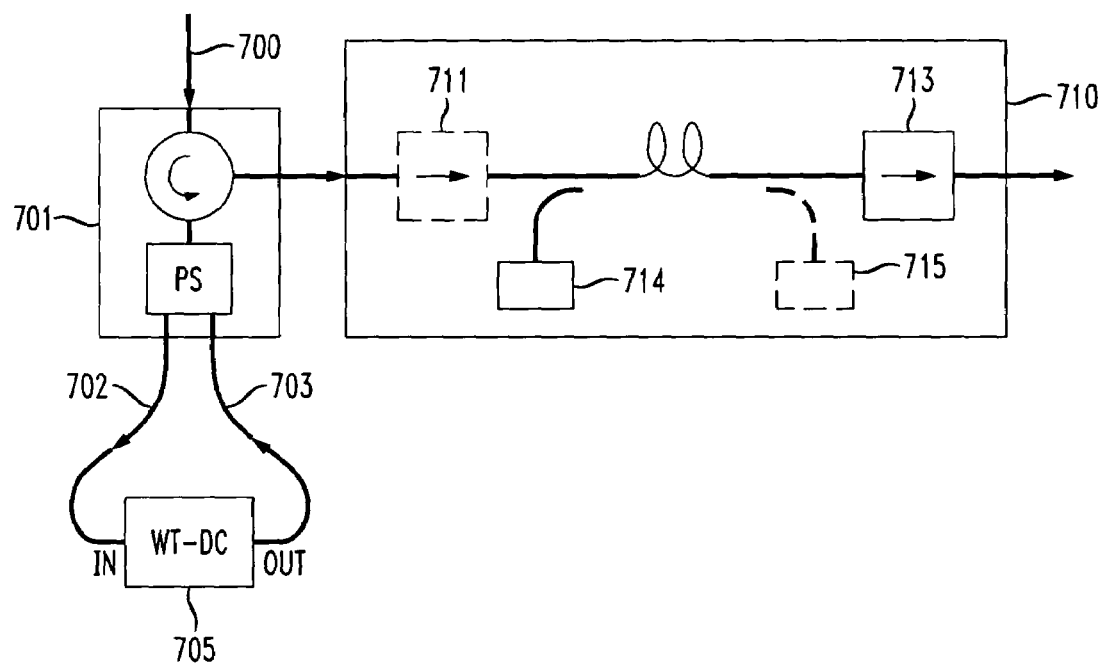
FIGS. 7A and 7B show my wavelength-tracking DC arranged together with an Erbium amplifier.

FIG. 7A shows on illustrative design of my WT-DC arranged together with an Erbium amplifier. In this arrangement, the WT-DC 705 is arranged in a polarization diversity scheme, in order to make the WT-DC function polarization independent even if the WT-DC device 705 itself is polarization dependent, in which polarization-maintaining fibers (PMFs) 702 and 703 are spliced to a circulator/polarization splitter (CPS) 701 in a known manner. In operation, an input optical signal 700 received by the circulator is split in the polarization splitter and coupled via PMF 702 to WT-DC 705. The dispersion compensated optical signal from WT-DC 705 is coupled via PMF 703 to polarization splitter and the circulator to Erbium amplifier 710. The circulator/polarization splitter (CPS) 701 eliminates the need for an input signal isolator 711 in Erbium amplifier 710. Thus, the Erbium amplifier 710 need only include the Erbium fiber output isolator 713 and either forward pump and coupler 714 or back pump and coupler 715. It should be noted that if the WT-DC 100 of FIG. 1 is implemented having only three MZI stages (as described in my previously-referenced application), it can relatively simply be made polarization independent on its own and therefore does not need the polarization diversity scheme using PMFs 702 and 703 and circulator/polarization splitter (CPS) 701.

Figure 7B:
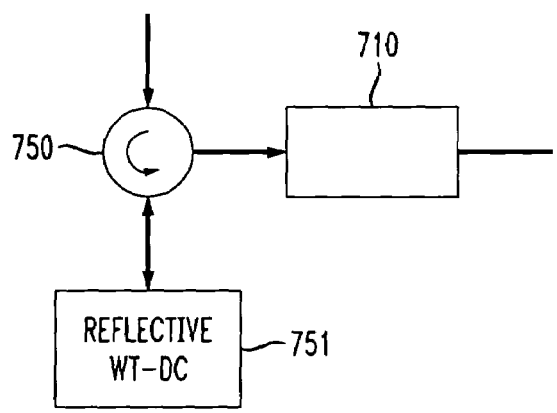

FIG. 7B shows a polarization independent reflective WT-DC 751 (as described in my previously-referenced application) arranged together with Erbium amplifier 710. A circulator 750 is used to couple the input optical signal 700 to WT-DC 751 and to couple the dispersion compensated optical signal to Erbium amplifier 710.

Various modifications of this invention will occur to those skilled in the art. Nevertheless all deviations from the specific teachings of this specification that basically rely upon the principles and their equivalents through which the art has been advanced are properly considered within the scope of the invention as described and claimed.

I claim:

1. A wavelength-tracking dispersion compensator, WT-DC, comprising
   a chromatic dispersion compensator, having a temperature-dependent wavelength characteristic, and operating at a reference wavelength for receiving an input signal that has a wavelength that can vary over time,
   a wavelength monitor, having a temperature-dependent wavelength characteristic, and operating at the same reference wavelength as the dispersion compensator for receiving the input signal and for generating an optical output signal,
   a detector control circuit for detecting the optical output signal from the wavelength monitor and for generating a control signal that indicates when the wavelength of the received input signal is misaligned with the reference wavelength of the dispersion compensator, and
   a temperature controller for changing the temperature of both the dispersion compensator and the wavelength monitor in response to the control signal so as to change the reference wavelength of the dispersion compensator and the wavelength monitor to align with the wavelength of the received input signal.

2. The WT-DC of claim 1 wherein the wavelength monitor additionally generates a second optical output signal and wherein the detector control circuit is a differential detector control circuit for detecting both said optical output signal and said second optical output signal from the wavelength monitor and for generating said control signal.

3. The WT-DC of claim 2 wherein both the dispersion compensator and the wavelength monitor are mounted on a common substrate and wherein the temperature controller changes the temperature of the common substrate.

4. The WT-DC of claim 3 further comprising
   a temperature sensor for determining the temperature of substrate and wherein
   when the WT-DC in a stand-by mode or when no input signal is received, the differential detector control circuit uses a signal from the temperature sensor to determine the temperature of temperature controller.

5. The WT-DC of claim 2 wherein the dispersion compensator has an adjustable dispersion.

6. The WT-DC of claim 2 wherein the dispersion compensator and wavelength monitor each include a half-wave plate to achieve polarization independence.

7. The WT-DC of claim 6 wherein the half-wave plate of the dispersion compensator and wavelength monitor are combined as one common half-wave plate.

8. The WT-DC of claim 2 wherein the input signal is a multi-wave signal and wherein the free-spectral range, FSR, of the dispersion compensator is equal to the channel spacing of the multiwave signal divided by a positive integer M.

9. The WT-DC of claim 2 wherein the free-spectral range, FSR, of the dispersion compensator is equal to N times the FSR of the wavelength monitor, where N is a positive integer.

10. The WT-DC of claim 2 wherein the free-spectral range, FSR, of the wavelength monitor is equal to N times the FSR of the dispersion compensator, where N is a positive integer.

11. The WT-DC of claim 2 wherein the differential detector control circuit includes
    two photodetectors for detecting the two optical output signals from the tunable wavelength monitor differential and generating two electrical signals,
    a subtractor for generating a differential signal from the two electrical signals and for outputting the differential electrical output signal, and
    a control circuit for receiving the differential electrical output signal and for generating the control signal therefrom.

12. The WT-DC of claim 2 being integrated as part of an optical apparatus consisting of one or more of the following optical components
    an optical transmitter,
    an optical amplifier,
    an optical filter,
    a wavelength multiplexer,
    a wavelength demultiplexer, and
    an optical receiver.

13. The WT-DC of claim 1 wherein both the dispersion compensator and the wavelength monitor are mounted on a common substrate and wherein the temperature controller changes the temperature of the common substrate.

14. The WT-DC of claim 1 wherein the dispersion compensator has an adjustable dispersion.

15. The WT-DC of claim 1 wherein the dispersion compensator and wavelength monitor each include a half-wave plate to achieve polarization independence.

16. The WT-DC of claim 1 wherein the input signal is a multi-wave signal and wherein the free-spectral range, FSR, of the dispersion compensator is equal to the channel spacing of the multi-wave signal divided by a positive integer M.

17. The WT-DC of claim 1 wherein the free-spectral range, FSR, of the dispersion compensator is equal to either N or 1/N times the FSR of the wavelength monitor, where N is a positive integer.

18. The WT-DC of claim 13 further comprising
a temperature sensor for determining the temperature of substrate and wherein
when the WT-DC in a stand-by mode or when no input signal is received, the detector control circuit uses a signal from the temperature sensor to determine the temperature of temperature controller.

19. The WT-DC of claim 1 being integrated as part of an optical apparatus consisting of one or more of the following optical components
an optical transmitter,
an optical amplifier,
an optical filter,
a wavelength multiplexer,
a wavelength demultiplexer, and
an optical receiver.

20. The WT-DC of claim 1 wherein the detector control circuit uses a received power level signal that is proportional to the input signal power and uses the detected optical output signal for generating the control signal that indicates when the wavelength of the received input signal is misaligned with the reference wavelength input signal.

21. The WT-DC of claim 1 wherein the input signal is wavelength modulated with a predetermined modulation and the detector control circuit detects that modulation and uses it for generating the control signal that indicates when the wavelength of the received input signal is misaligned with the reference wavelength input signal.

22. A method of operating a wavelength-tracking dispersion, WT-DC, compensator comprising the steps of:
receiving an input signal at a chromatic dispersion compensator having a temperature-dependent wavelength characteristic and operating at a reference wavelength,
receiving the input signal at a wavelength monitor, having a temperature-dependent wavelength characteristic and operating at the same reference wavelength as the dispersion compensator and generating an optical output signal,
detecting the optical output signal and generating a control signal that indicates when the wavelength of the received input signal is misaligned with the reference wavelength of the dispersion compensator, and
changing the temperature of both the dispersion compensator and the wavelength monitor in response to the control signal so as to change the reference wavelength of the dispersion compensator and the wavelength monitor to align with the wavelength of the received input signal.

23. The method of claim 22 wherein the wavelength monitor receiving step additionally generates a second optical output signal and wherein the detecting step detects both said optical output signal and said second optical output signal and generates said control signal therefrom.

* * * * *